United States Patent [19]

Thomas

[11] 4,106,521

[45] Aug. 15, 1978

[54] COLLAPSIBLE CANE APPARATUS

[75] Inventor: Morton I. Thomas, Nyack, N.Y.

[73] Assignee: Temco Products, Inc., Passaic, N.J.

[21] Appl. No.: 799,397

[22] Filed: May 23, 1977

[51] Int. Cl.[2] .......... F16M 13/08

[52] U.S. Cl. .......... 135/67; D88/5

[58] Field of Search .......... D88/5; 135/65, 67, 69; 294/58; 16/114 R; 248/166, 168, 460, 463, 464, 465

[56] References Cited

U.S. PATENT DOCUMENTS

| | | | |
|---|---|---|---|
| D. 216,288 | 12/1969 | Murcott | D88/5 |
| 2,518,763 | 8/1950 | DuBois | 135/67 |
| 2,596,302 | 5/1952 | Squyres | 248/46 J X |
| 3,145,966 | 8/1964 | Landon | 248/464 |
| 3,840,034 | 8/1974 | Smith | 135/67 |
| 4,036,465 | 7/1977 | Kellner | 248/463 |

*Primary Examiner*—Werner H. Schroeder
*Assistant Examiner*—Conrad L. Berman
*Attorney, Agent, or Firm*—Richard C. Woodbridge

[57] ABSTRACT

The folding cane apparatus includes a pair of front legs and a pair of rear legs which are attached together at the apex of the cane by a short common pivot rod. Both the front and rear pairs of legs include an inner tubular member telescoped into an outer tubular member so that the height of the cane may be adjusted. The outer tubular member of the front pair of legs is a continuous metal tube which also forms the handle of the cane. The structure of the cane provides for improved strength and stability, yet allows the user to collapse the apparatus to a relatively flat and storable size.

8 Claims, 8 Drawing Figures

COLLAPSIBLE CANE APPARATUS

BACKGROUND OF THE INVENTION

1. Field of the Invention

This invention relates to a folding cane apparatus.

2. Description of the Prior Art

Four legged, collapsible walking canes are known to those of ordinary skill in the art. One well known type is described in U.S. Pat. No. Des. 216,288 issued to Charles E. Murcott. That particular model is illustrated in FIG. 1 as Prior Art. One problem with such prior art devices is that they frequently exhibit an undesirable amount of wobble and instability. Even small amounts of wobble and instability can be serious in view of the fact that the users of such canes are typically senior citizens, invalids or convalescent patients. It is also necessary that the cane be lightweight and collapsible so that the apparatus may be manipulated and stored with a minimum amount of difficulty.

SUMMARY OF THE INVENTION

Briefly described, the invention comprises a pair of telescoping front legs connected together by a common pivot rod to a pair of telescoping rear legs. All four legs include an inner tubular member which telescopes into an outer tubular member. The length of the legs may be adjusted by means of a locking button housed within the inner tubular member and adapted to engage with one of a plurality of locking holes located along the length of the outer tubular member. A handle including a rubberized grip is attached to both pairs of legs at the location of the common pivot rod. The outer tubular member of the front pair of legs and the handle support section all comprise a continuous piece of metal tubing. The front and rear pairs of legs are connected by a pair of folding hinges which are adapted to go slightly overcenter in the unfolded state so as to give the cane additional rigidity. Further rigidity to the front and rear pair of legs is provided by brackets connecting the outer tubular members respectively of the front legs and back legs to each other. In the unfolded state the cane provides improved strength and stability due to its pyramid-like structure. The cane may be easily folded to a flat package for convenient storage or for travel purposes.

DETAILED DESCRIPTION OF THE INVENTION

During the course of the description, like numbers will be used to designate like elements according to the different views of the invention.

Figure 1:
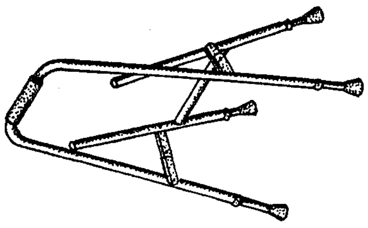
FIG. 1 PRIOR ART
FIG. 1 illustrates a prior art invalid walker as described in U.S. Pat. No. Des. 216,288.

A typical prior art folding cane is illustrated in FIG. 1. The same device is described in U.S. Pat. No. Des. 216,288 for an INVALID WALKER issued to Charles E. Murcott. The problems arising with canes of such a structure have been described in the "Description of the Prior Art" above.

Figure 2:
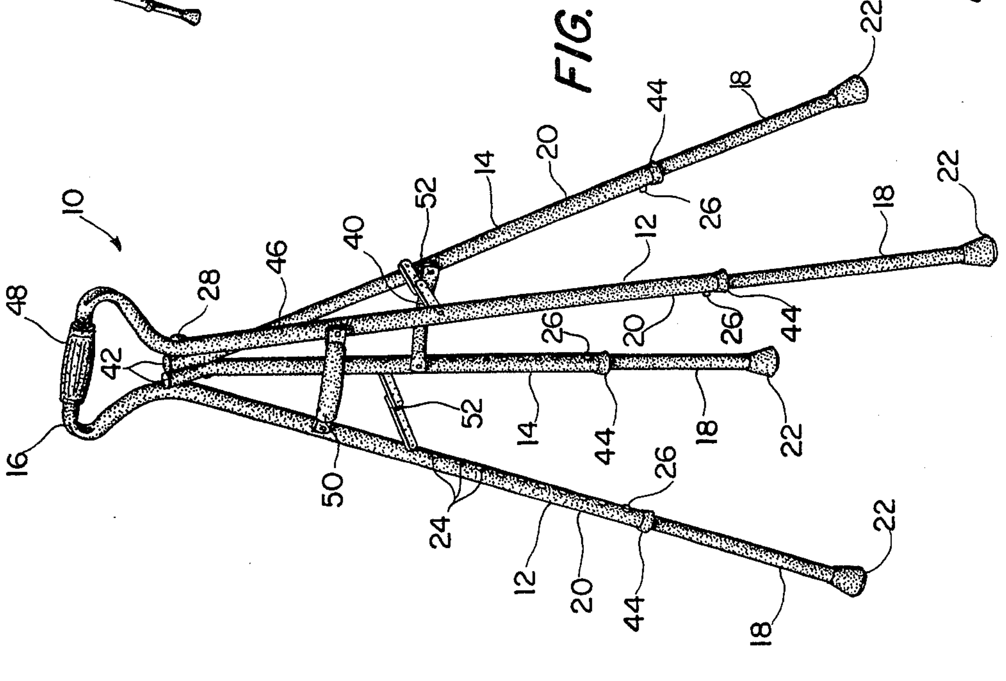
FIG. 2 is a perspective view of the folding cane according to the preferred embodiment thereof illustrating the cane in its unfolded state with the telescoping legs extended.

A folding cane according to the preferred embodiment of the invention is illustrated in perspective view in FIG. 2. The cane 10 includes a pair of front or inside legs 12, a pair of rear legs 14 and a handle section 16. The front legs 12 face inwardly towards the cane user when the cane is in its unfolded state.

Each of the four cane legs includes an inner tubular member 18 which is adapted to telescope into an outer tubular 20. The lower end of each tubular member 18 includes a rubberized foot 22 at the point where the cane makes contact with the floor. Each tubular member 18 carries inside it a spring-loaded pushbutton of the type found in many conventional orthopedic devices. The pushbuttons used on the cane are tapered to maintain full contact with the height adjustment locking holes. An acceptable type of pushbutton mechanism is disclosed, for example, in U.S. Pat. No. 3,947,140 issued on Mar. 30, 1976 to Morton I. Thomas for a CONNECTOR FOR TELESCOPING TUBULAR STICK MEMBERS. The upper tubular member includes a plurality of locking holes 24 adapted to selectively engage the locking button mechanism 26 carried by the inner tubular member 18. As shown in FIG. 2, each locking button 26 engages one of the lowest locking holes 24 in the upper tubular member 20 when the legs 12 and 14 of the cane 10 are in their most extended state.

The front and rear legs 12 and 14 form a slightly off center pyramid having an apex at the junction with handle section 16. A common pivot rod 28 passes through all four legs at the apex of the cane. The details of the common pivot rod 28 may be more fully understood with reference to the cross-sectional view of FIG. 8. The rod 28 preferably comprises a rivet having a head section 30 and a compressed end section 32. Alternatively, a bolt having a head at one end and a threaded section at the other end can be employed with an anchor nut to accomplish the same function as the rivet. A pair of resilient washers 36 are located respectively between the interface of the front legs and rear legs and serve to allow the front and rear legs to rotate easily with respect to one another around the common pivot rod 28. As illustrated in cross-sectional view in FIG. 8, the common pivot rod 28 travels first through one of the front legs 12, then in sequence through both the rear legs 14 and finally through the other front leg 12 before it is secured on the other side by the locking nut 34.

Both rear legs 14 are independent members joined together near the top thereof by the common pivot rod 28 and also secured about an inch below that connecting point by a second rivet means 38. The rear legs 14 further are connected together further down the cane by brace 40 which is rigidly connected to both rear legs 14 by a pair of rivets. Each rear leg includes a plastic cap 42 at the top thereof and a plastic collar 44 at the bottom of the outer tubular member 20. The rear legs 14 are essentially independent units rigidly connected to one another.

In contrast to the rear legs 14, the front legs 12 are continuously connected together by a single piece of metal tubing 46. The continuous tubing 46 comprises both of the outer tubular members 20 of both front legs 12 and the handle section 16. The handle section 16 also includes a standard rubberized grip 48. A front leg bracket 50 is connected across the upper tubular members 20 of the front legs 12 by rivets in the same manner that bracket 40 is connected across the rear leg members 14. The lower portions of the upper tubular members 20 of the front legs 12 are also capped by collars 44 in the manner previously described with reference to the rear legs 14. The continuous V-shaped tubing member 46 has several advantages. First of all, it is economical in that it is continuous. Second, it adds extra strength and rigidity to the frame structure. In particular, it makes for a very rigid connection between the handle section 16 and the front legs 12.

Figure 3:
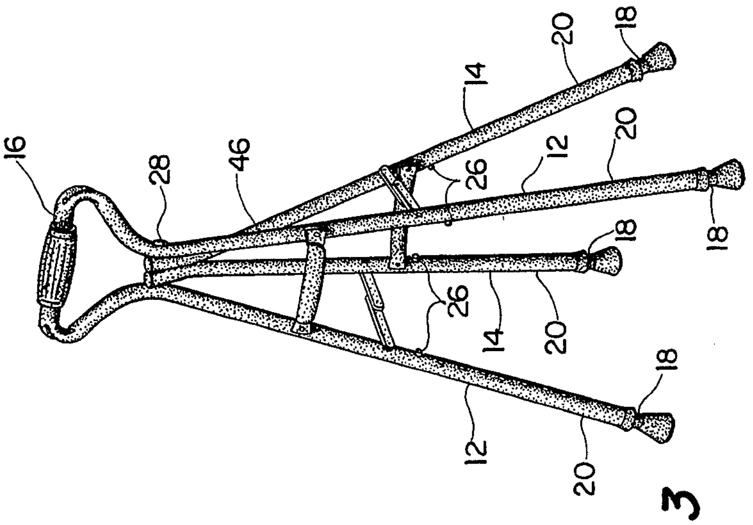
FIG. 3 is a perspective view of the unfolded cane of FIG. 2 illustrating the telescoping legs in their collapsed state.

As shown in FIG. 3, the cane can be collapsed down to a very small size in which case the inner tubular members 18 of the legs are collapsed entirely into the upper tubular members 20. According to the preferred embodiment of the invention the cane has a height range of $28\frac{3}{4}$ inches to $37\frac{1}{4}$ inches and adjusts in 1 inch increments. Similarly, the width of the cane may vary between $15\frac{1}{2}$ inches to 20 inches and the depth of the cane may vary between 12 inches to $15\frac{1}{2}$ inches, depending upon the extent to which the legs are telescoped.

The pyramid-like structure of the cane is considered to be an important improvement over the prior art. As the height of the cane is increased, the base size also increases in width and depth. The increased base size therefore provides greater support and stability for taller and therefore often heavier patients. The closed handle of the cane is adapted to concentrate the patient's weight evenly over the base of the cane for greater safety. The thrust of the handle section 16 is passed directly through the common pivot rod 28 to all four legs simultaneously. In addition, the V-shaped member 46 is rigidly and directly connected to the front legs 12 for improved distribution of load. The common pivot rod 28 has advantages over prior art devices such as illustrated in FIG. 1 in that the device of FIG. 1 includes two pivot points which may independently move with respect to one another. That additional source of instability has been eliminated from the structure of the present invention by means of common pivot rod 28.

Figure 4:
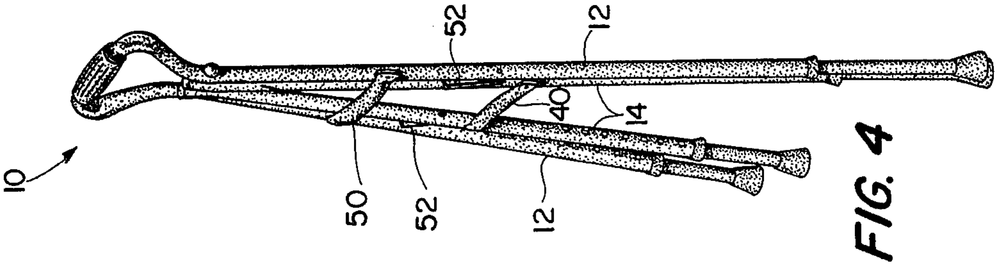
FIG. 4 is a perspective view of the preferred folding cane apparatus of FIG. 2 in its folded state.

The cane is illustrated in partial perspective in its collapsed state in FIG. 4. In its collapsed or unfolded state the cane 10 has a depth of about 2 inches and may be easily stored for travelling in cars, buses, trains, planes or other similar modes of transportation. A pair of folding hinges 52 connect one front leg 12 to one rear leg 14 respectively. The hinges 52 in conjunction with the braces 40 and 50 form a roughly box-like structure which additionally improves the stability and strength of the cane. The hinges 52 are adapted to go slightly over-center in the unfolded state so as to effectively lock the cane in its erected or unfolded mode. The hinges 52 are connected to the legs by a set of standard rivet-type connections which allow the ends of the hinges to rotate as the cane goes between its folded and unfolded state and vice versa.

In order to collapse the cane the hinges are pushed upward at the center thereof and the rear legs 14 are drawn inward toward the front legs 12. For convenience purposes it would probably be desirable to collapse the telescoping legs to the size illustrated in FIG. 3 in order to minimize the dimensions of the folded cane.

The cane 10 preferably has an anodized aluminum frame. Accordingly, a typical cane weighs about 3 pounds and in its collapsed mode it is preferable to package two canes per carton for a total shipping weight of approximately 7 pounds. In this manner two canes may be conveniently shipped via common carriers such as United Parcel Service.

Figure 5:
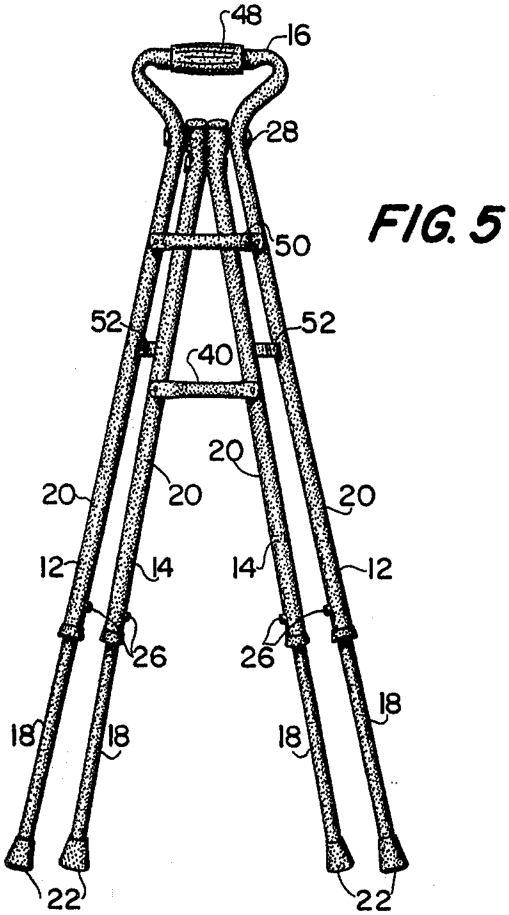
FIG. 5 is a front elevational view of the folding cane apparatus.
Figure 6:
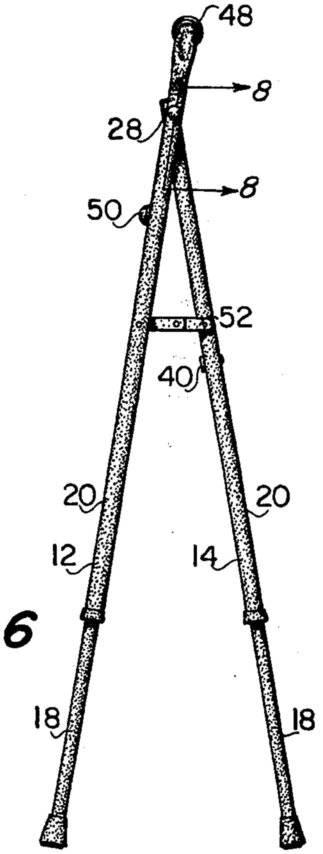
FIG. 6 is a side elevational view of the cane apparatus illustrated in FIG. 5.
Figure 7:
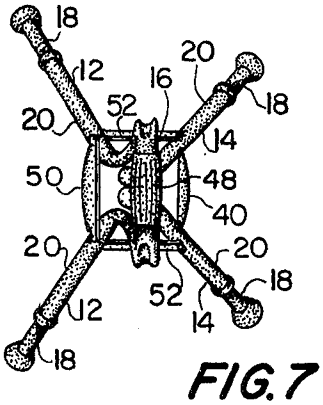
FIG. 7 is a top plan view of the cane illustrated in FIGS. 5 and 6.
Figure 8:
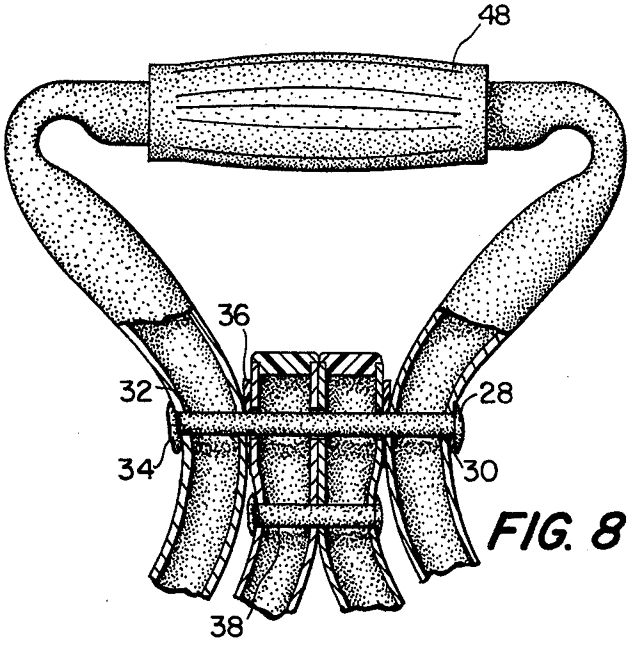
FIG. 8 is a cross-sectional view of the common pivot rod as seen from lines 8—8 in FIG. 6.

The cane 10 is further illustrated in standard front, side and top plan views in FIGS. 5, 6 and 7. FIG. 8 illustrates in detail the nature of the common connecting rod 28 as shown from lines 8—8 in FIG. 6 and as further explained in detail previously.

While the invention has been described with reference to the preferred embodiment thereof, it will be appreciated by those of ordinary skill in the art that various modifications may be made in the materials and structure without departing from the spirit and scope of the invention. For example, the frame could conceivably be constructed from steel materials if weight were no object. Brazing and welding connections can be used in place of rivets. There are also available other mechanisms which could replace the folding hinge and telescoping leg sections as described according to the preferred embodiment of the invention. Such substitutions are believed to be within the knowledge of one skilled in the art.

I claim:

1. A single hand folding cane apparatus comprising:
   - a generally V-shaped frame including a handle section, a central pivot section connected to said handle section, and a first pair of telescoping legs connected to said central pivot section, said V-shaped frame having a relatively narrow waist at the central pivot section with respect to said handle section and to said first pair of telescoping legs;
   - a second pair of telescoping legs; and,
   - a common pivot means passing through said central pivot section of said V-shaped frame for connecting said V-shaped frame and said second pair of legs together in a divergent manner so as to form an expandable pyramid-like base for said cane apparatus in which said common pivot means forms the apex of said pyramid-like base, whereby a downward force applied to the handle section is concentrated at the central pivot section through said common pivot means and into said first and second pair of telescoping legs and whereby the stability of the apparatus increases as the first and second pair of telescoping legs are extended due to the substantial divergent spreading of the legs in two dimensions during the extension process.

2. The apparatus of claim 1 wherein said V-shaped frame essentially comprises a continuous piece of tubing material.

3. The apparatus of claim 2 further comprising: a collapsible locking means for locking said pairs of telescoping legs firmly in position when said cane is in its unfolded state.

4. The apparatus of claim 3 wherein each of said telescoping legs comprise an inner tubular member located within an outer tubular member.

5. The apparatus of claim 4 wherein said telescoping legs further include:

a locking button at least partially housed within said inner tubular member, said locking button being selectively locatable in one of a plurality of locking holes located in said outer tubular member, wherein said inner tubular member and said outer tubular member may be selectively positionable with respect to one another.

6. The apparatus of claim 5 wherein said common pivot means comprises a rod which passes in sequence through one side of the central pivot section of said V-shaped frame, both pair of said second legs and the other side of the central pivot section of said V-shaped frame, said rod being secured at both ends thereof.

7. The apparatus of claim 6 wherein said handle section includes a grip means thereon.

8. The apparatus of claim 7 wherein said collapsible locking means comprises a hinge-like means which does not go far beyond an over-center position.

* * * * *